United States Patent
Zhu et al.

(10) Patent No.: US 9,090,128 B2
(45) Date of Patent: Jul. 28, 2015

(54) WHEEL ASSEMBLY FOR A VEHICLE AND A METHOD OF MANUFACTURING THE WHEEL ASSEMBLY

(71) Applicant: GM GLOBAL TECHNOLOGY OPERATIONS LLC, Detroit, MI (US)

(72) Inventors: Jinshuo Zhu, Novi, MI (US); Chong Wang, Novi, MI (US); Alan V. Parrett, Milford, MI (US); Christopher A. Stirlen, Milford, MI (US); Zachary L. Cohen, Huntington Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 13/968,734

(22) Filed: Aug. 16, 2013

(65) Prior Publication Data

US 2015/0047920 A1    Feb. 19, 2015

(51) Int. Cl.
*F01N 5/00* (2006.01)
*B60C 19/00* (2006.01)

(52) U.S. Cl.
CPC .................................. *B60C 19/002* (2013.04)

(58) Field of Classification Search
CPC ................................ F01N 13/14; B06B 21/12
USPC .......................................................... 181/211
See application file for complete search history.

(56) References Cited

U.S. PATENT DOCUMENTS

| | | | |
|---|---|---|---|
| 4,896,921 A * | 1/1990 | Sato et al. ...................... 301/5.1 |
| 5,479,974 A | 1/1996 | Noggle et al. | |
| 5,891,278 A * | 4/1999 | Rivin ............................. 152/418 |
| 5,899,253 A * | 5/1999 | Marron et al. .............. 152/381.5 |
| 6,244,314 B1 | 6/2001 | Dodt et al. | |
| 6,309,026 B1 | 10/2001 | Svedhem | |
| 6,343,843 B1 | 2/2002 | Nishikawa | |
| 6,422,655 B1 | 7/2002 | Britton et al. | |
| 6,516,849 B2 * | 2/2003 | Flament et al. ............... 152/400 |

(Continued)

FOREIGN PATENT DOCUMENTS

| | | |
|---|---|---|
| EP | 0737597 A1 | 10/1996 |
| WO | 2007051232 A1 | 5/2007 |

(Continued)

OTHER PUBLICATIONS

Gary S. Vasilash; Automotive Design & Production article entitled: "Looking at the 2013 Lexus LS"; website: www.autofieldguide.com/articles/looking-at-the-2013-lexus-ls; dated: Sep. 19, 2012; 6 pages.

*Primary Examiner* — Forrest M Phillips
(74) *Attorney, Agent, or Firm* — Quinn Law Group, PLLC (57) ABSTRACT

A wheel assembly for a vehicle and a method of manufacturing the wheel assembly for the vehicle are disclosed. The wheel assembly includes a rim and a tire. The tire includes a distal wall, a first side wall and a second side wall, with the first and second side walls extending from the distal wall and each of the side walls attached to the rim such that the distal wall is spaced from the rim to define an interior cavity between the tire and the rim. The wheel assembly also includes a resonator defining a hole such that the resonator presents an inner wall defining a boundary of the hole. The hole cooperates with the interior cavity. The resonator includes an insert mounted to the inner wall. The insert defines an aperture in fluid communication with the interior cavity for attenuating sound produced inside the interior cavity.

20 Claims, 7 Drawing Sheets

(56) References Cited

U.S. PATENT DOCUMENTS

| | | |
|---|---|---|
| 6,588,469 B2 | 7/2003 | Yukawa et al. |
| 6,598,636 B1 | 7/2003 | Schurmann et al. |
| 6,755,483 B2 | 6/2004 | Yukawa et al. |
| 6,880,597 B2 | 4/2005 | Yukawa et al. |
| 7,013,940 B2 | 3/2006 | Tsihlas |
| 7,140,412 B2 | 11/2006 | Tanno |
| 7,152,643 B2 * | 12/2006 | Morinaga et al. .......... 152/381.5 |
| 7,182,114 B2 | 2/2007 | Yukawa |
| 7,188,652 B2 | 3/2007 | Yukawa |
| 7,347,239 B2 | 3/2008 | Yukawa et al. |
| 7,360,570 B2 | 4/2008 | Ishida |
| 7,387,141 B2 | 6/2008 | Tanno et al. |
| 7,389,802 B2 | 6/2008 | Kanz et al. |
| 7,455,092 B2 | 11/2008 | Yukawa et al. |
| 7,475,713 B2 | 1/2009 | Naito et al. |
| 7,490,644 B2 | 2/2009 | Yukawa |
| 7,500,499 B2 | 3/2009 | Tanno |
| 7,681,611 B2 | 3/2010 | Ikeda et al. |
| 7,681,613 B2 | 3/2010 | Yukawa et al. |
| 7,690,410 B2 * | 4/2010 | Kamiyama et al. ........ 152/381.5 |
| 7,694,707 B2 | 4/2010 | Agostini et al. |
| 7,911,332 B2 * | 3/2011 | Caretta et al. ................. 340/442 |
| 8,196,628 B2 * | 6/2012 | Fowler-Hawkins ....... 152/381.6 |
| 2004/0250935 A1 * | 12/2004 | Morinaga et al. .......... 152/381.5 |
| 2005/0212350 A1 * | 9/2005 | Yamamoto et al. ...... 301/63.101 |
| 2008/0264539 A1 | 10/2008 | Merino-Lopez et al. |
| 2008/0277997 A1 * | 11/2008 | Kamiyama et al. ...... 301/95.101 |
| 2009/0026006 A1 | 1/2009 | Engel et al. |
| 2009/0071585 A1 | 3/2009 | Tanno |
| 2009/0090446 A1 | 4/2009 | Ikeda et al. |
| 2009/0151837 A1 | 6/2009 | Uhlenbruch |
| 2009/0277549 A1 | 11/2009 | Tanno |
| 2009/0277553 A1 | 11/2009 | Tanno et al. |
| 2009/0314403 A1 | 12/2009 | Tanno |
| 2009/0320980 A1 | 12/2009 | Tanno |
| 2010/0012243 A1 | 1/2010 | Tanno et al. |
| 2010/0012244 A1 | 1/2010 | Tanno et al. |
| 2010/0071820 A1 | 3/2010 | Noggle et al. |
| 2010/0307654 A1 | 12/2010 | Dautrey et al. |
| 2012/0285766 A1 * | 11/2012 | Wirth et al. .................... 181/228 |
| 2012/0325383 A1 | 12/2012 | Moore et al. |
| 2014/0300177 A1 * | 10/2014 | Rathje et al. ............. 301/95.104 |

FOREIGN PATENT DOCUMENTS

| | | |
|---|---|---|
| WO | 2008071422 A1 | 6/2008 |
| WO | 2009053352 A1 | 4/2009 |

* cited by examiner

WHEEL ASSEMBLY FOR A VEHICLE AND A METHOD OF MANUFACTURING THE WHEEL ASSEMBLY

TECHNICAL FIELD

The present disclosure relates to a wheel assembly for a vehicle and a method of manufacturing the wheel assembly, with the wheel assembly including a resonator.

BACKGROUND

Many vehicles utilize tires to move the vehicles along a road. Each tire is generally mounted to a rim to create a tire cavity containing air. As the tire rotates along the road, the tire moves over various rough surfaces which can deform or excite the tire to change the air pressure in the tire cavity. The change in air pressure in the tire cavity causes stationary sound waves inside the tire and vibrations in the wheel which can travel through the vehicle structure to create noise in the vehicle structure, and this noise can sometimes be heard by an occupant of a passenger compartment of the vehicle.

SUMMARY

The present disclosure provides a wheel assembly for a vehicle. The wheel assembly includes a rim and a tire. The tire includes a distal wall, a first side wall and a second side wall, with the first and second side walls extending from the distal wall and each of the side walls attached to the rim such that the distal wall is spaced from the rim to define an interior cavity between the tire and the rim. The wheel assembly also includes a resonator defining a hole such that the resonator presents an inner wall defining a boundary of the hole. The hole cooperates with the interior cavity. The resonator includes an insert mounted to the inner wall. The insert defines an aperture in fluid communication with the interior cavity for attenuating sound produced inside the interior cavity.

The present disclosure also provides a method of manufacturing a wheel assembly for a vehicle. The method includes providing a resonator defining a hole such that the resonator presents an inner wall defining a boundary of the hole. The method also includes attaching a first side wall of a tire to a rim and attaching a second side wall of the tire to the rim. The tire and the rim cooperate with each other to define an interior cavity therebetween. The method further includes mounting an insert of the resonator to the inner wall, with the insert defining an aperture in fluid communication with the interior cavity to attenuate sound produced inside the interior cavity. Mounting the insert to the inner wall occurs before attaching the first side wall of the tire to the rim and attaching the second side wall of the tire to the rim.

Generally, the wheel assembly attenuates sound produced inside the tire to reduce sound heard by the occupant of the vehicle due to the tire. More specifically, the resonator is designed to suppress sound, such as noise, created inside the tire. Furthermore, the insert of the resonator is interchangeable or replaceable to allow manufacturing of the rim to be standardized, which can reduce manufacturing costs and/or assembly costs. Different size rims and/or different size tires can produce different sounds in the interior cavity, and therefore, various features of the insert can be changed to accommodate different rim configurations and/or different tire configurations to attenuate different sounds, such as noise, produced inside the interior cavity by different rims/tires. Additionally, various environmental conditions, such as temperature and humidity, can cause the interior cavity to produce different sounds therein, and thus, the insert can be designed to accommodate various environmental conditions.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
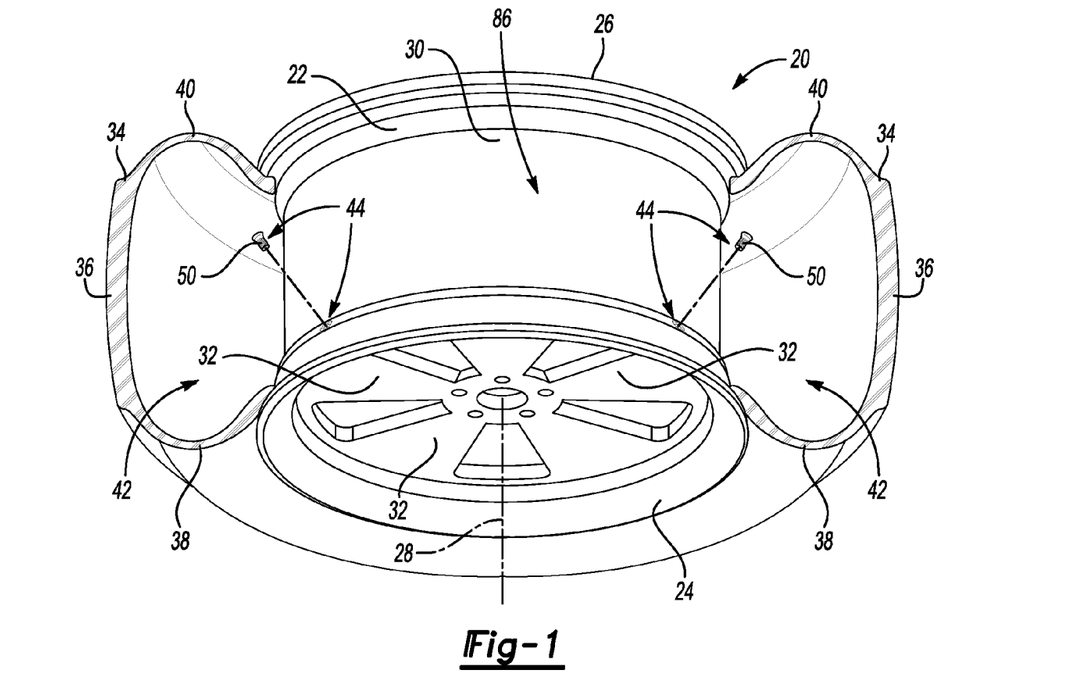
FIG. 1 is a schematic perspective view of a wheel assembly, with a portion of a tire cross-sectioned to illustrate an interior cavity and a plurality of inserts exploded from a rim.

Referring to the Figures, wherein like numerals indicate like or corresponding parts throughout the several views, a wheel assembly 20 for a vehicle is generally shown in FIG. 1. Generally, the wheel assembly 20 can be useful for vehicles, such as automotive vehicles. It is to be appreciated that the wheel assembly 20 can also be useful for non-automotive applications including, for example, farm and aviation applications, etc.

Referring to FIGS. 1-6, the wheel assembly 20 includes a rim 22. Generally, the rim 22 can include a first side 24 and a second side 26 spaced from each other along a pivot axis 28. For example, when utilizing a four-wheeled vehicle, the first side 24 of the rim 22 can face outwardly to be readily visible outside of the vehicle. It is to be appreciated that the rim 22 can be formed of aluminum, steel and/or any other suitable material(s).

Figure 4:
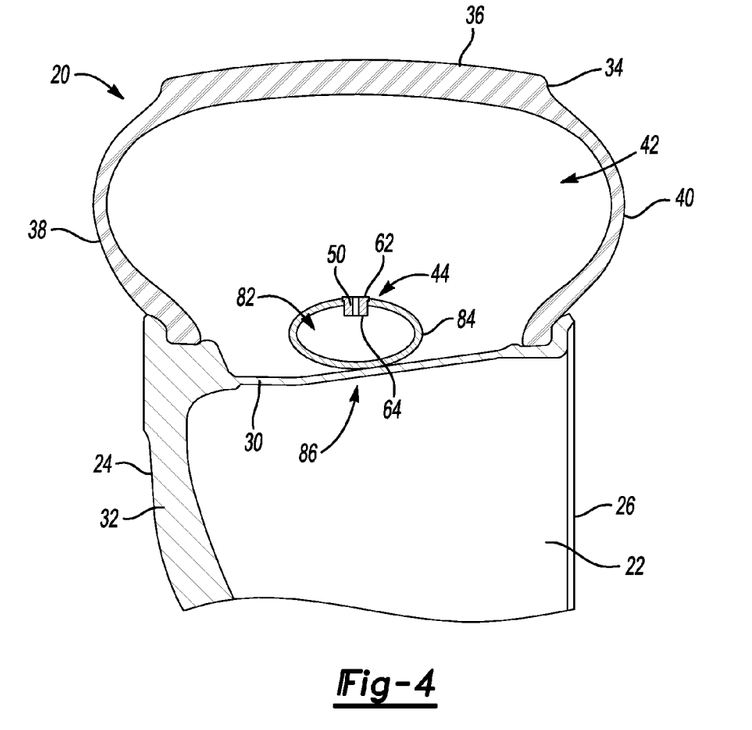
FIG. 4 is a schematic cross-sectional view of a housing of the resonator disposed inside the interior cavity generally along the middle portion of the rim.
Figure 5:
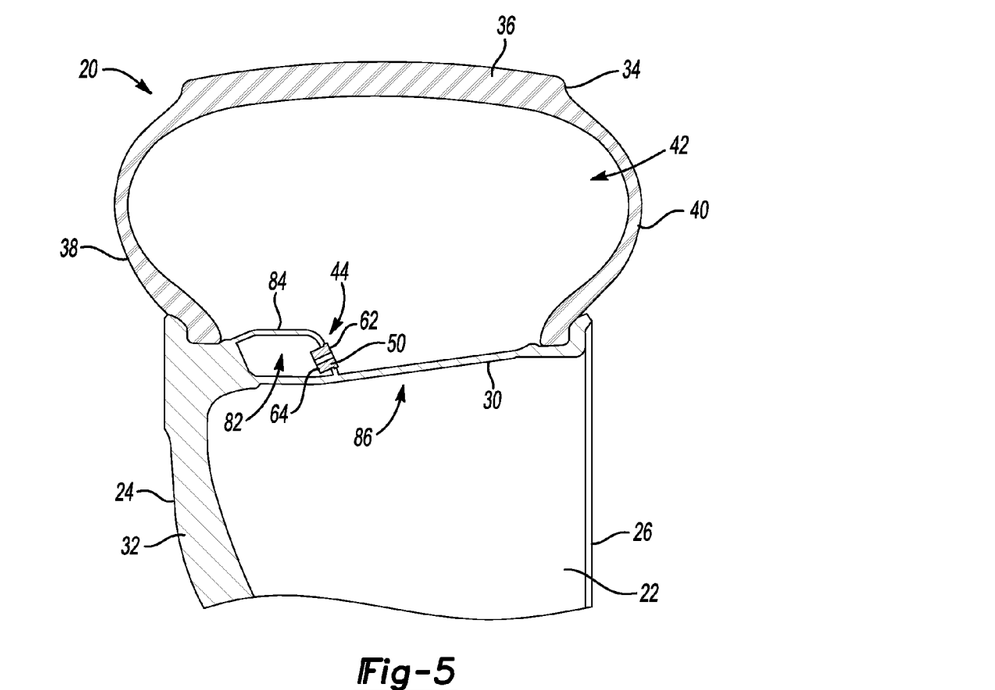
FIG. 5 is a schematic cross-sectional view of the housing of the resonator adjacent to the first side of the rim.
Figure 6:
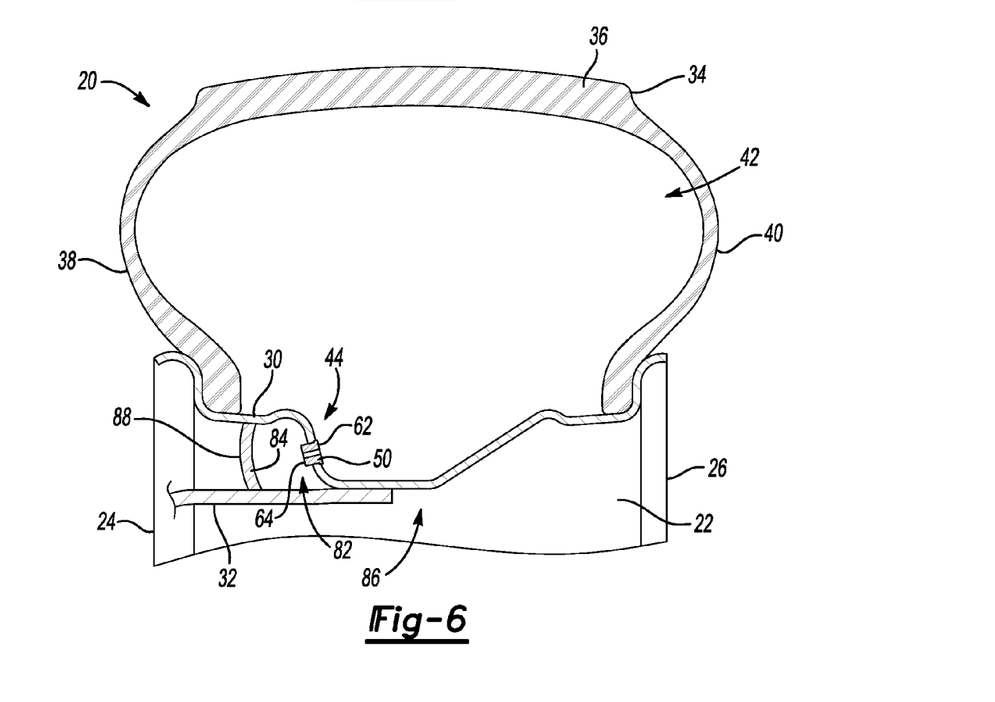
FIG. 6 is a schematic cross-sectional view of the resonator disposed outside of the interior cavity.

As best shown in FIG. 1, the rim 22 can further include an annular body 30 and a flange 32 extending from the annular body 30. In certain embodiments, the flange 32 can be further defined as a plurality of flanges 32 extending from the annular body 30. The flanges 32 can be commonly referred to as spokes. The annular body 30 and the flanges 32 can be formed as a unit or one-piece as shown in FIGS. 2-5. In other words, the annular body 30 and the flanges 32 can be integrally formed to each other. Alternatively, the annular body 30 and the flanges 32 can be formed of more than one-piece as shown in FIG. 6 such that the flanges 32 are welded or affixed to the annular body 30 separately. It is to be appreciated that the rim 22 can be any suitable configuration.

Referring to FIGS. 1-6, the wheel assembly 20 further includes a tire 34. The tire 34 includes a distal wall 36, a first side wall 38 and a second side wall 40, with the first and second side walls 38, 40 extending from the distal wall 36. Each of the side walls 38, 40 are attached to the rim 22 such that the distal wall 36 is spaced from the rim 22 to define an interior cavity 42 between the tire 34 and the rim 22. Generally, the interior cavity 42 is filled with a fluid, such as a gas. In other words, when the tire 34 is mounted to the rim 22, the interior cavity 42 is pressurized with the gas to inflate the tire 34. The gas can be air as is well known. It is to be appreciated that the tire 34 can be any suitable configuration.

When the tire 34 is mounted to the rim 22 and attached to the vehicle, the tire 34 and the rim 22 rotate about the pivot axis 28 in unison or simultaneously along a road or a surface. Generally, the distal wall 36 of the tire 34 engages the surface of the road. As the tire 34 moves over various surfaces of the road, such as rough surfaces, the tire 34 can deform which changes the air pressure in the interior cavity 42, and thus causes vibrations or sound waves, such as stationary sound waves, in the interior cavity 42 at one or more frequencies, such as one or more resonant frequencies. These vibrations or sound waves travel through the vehicle structure to create sound or noise in the vehicle structure that can be heard by an occupant of the vehicle. As discussed further below, the wheel assembly 20 reduces sound, such as noise, heard by the occupant of the vehicle due to the rim 22/tire 34. The frequency or frequencies produced in the interior cavity 42 can be based on the size of the rim 22, the size of the tire 34, the temperature inside the interior cavity 42, the speed that the tire 34 and the rim 22 are traveling, the humidity inside the interior cavity 42, etc. Generally, the frequencies, such as resonant frequencies, produced in the interior cavity 42 are of from about 160 hertz (Hz) to about 240 hertz (Hz).

Figures 7, 8, 9, 10:
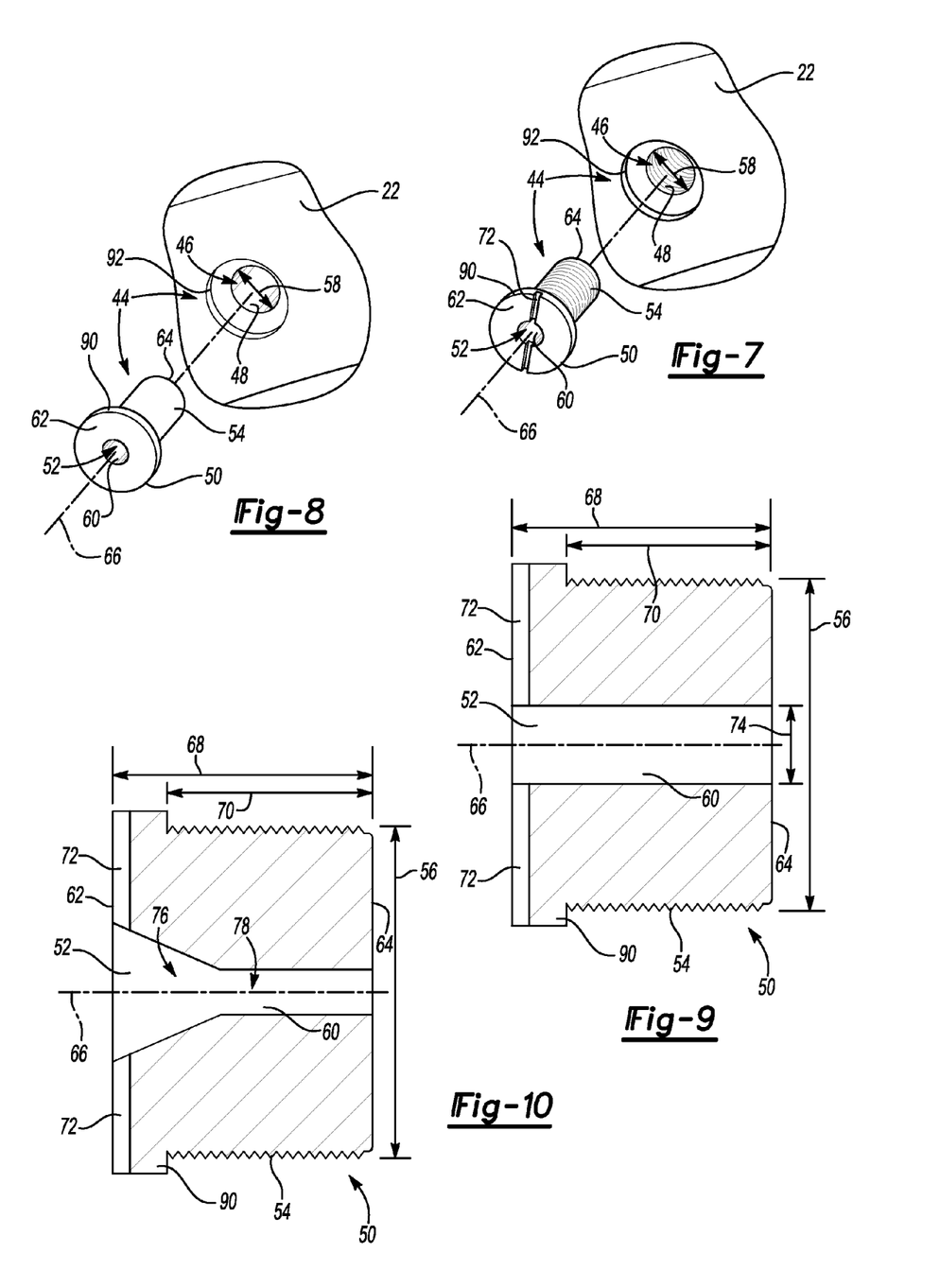
FIG. 7 is a schematic broken exploded perspective view of the rim and one insert with threads.
FIG. 8 is a schematic broken exploded perspective view of the rim and one insert without threads.
FIG. 9 is a schematic cross-sectional view of the insert presenting an interior wall being constant between a first end and a second end.
FIG. 10 is a schematic cross-sectional view of the insert, with the interior wall including a first portion defining a first configuration and a second portion defining a second configuration different from the first configuration.

Generally, as best shown in FIGS. 7 and 8, the wheel assembly 20 also includes a resonator 44 defining a hole 46 such that the resonator 44 presents an inner wall 48 defining a boundary of the hole 46. The hole 46 cooperates with the interior cavity 42 and the hole 46 is standardized such that the inner wall 48 is standardized as discussed below. The resonator 44 is utilized to attenuate the sound produced as the tire 34 moves over various surfaces, such as rough surfaces. In other words, the resonator 44 attenuates the frequencies or sound waves created in the interior cavity 42 as the tire 34 moves along the road. Therefore, the resonator 44 reduces the sound, such as noise, heard by the occupant of the vehicle due to the tire 34 moving over various surfaces of the road, such as rough surfaces. For example, the resonator 44 can attenuate sound at the frequencies, such as resonant frequencies, of from about 160 hertz (Hz) to about 240 hertz (Hz). It is to be appreciated that the resonator 44 can attenuate frequencies above 240 Hz or below 160 Hz. The resonator 44 can be referred to as a Helmholtz resonator. The Helmholtz resonator frequency can be determined by equation (1):

$$f = \frac{c}{2\pi}\sqrt{\frac{A}{VL}} \tag{1}$$

wherein f is the frequency;
wherein c is the speed of sound;
wherein A is the area of the aperture 52;
wherein V is the volume of the chamber 82; and
wherein L is the first length 68 of the interior wall 60.
It is to be appreciated that the frequency obtained from equation (1) can be an approximation.

Turning to FIGS. 2-8, the resonator 44 includes an insert 50 mounted to the inner wall 48. Generally, the insert 50 cooperates with the interior cavity 42. The insert 50 defines an aperture 52 in fluid communication with the interior cavity 42 for attenuating sound produced inside the interior cavity 42. Various features of the insert 50 can be changed or modified to attenuate different sounds, such as noise, produced by, for example, different rim 22 configurations and/or different tire 34 configurations, etc. The insert 50 can be formed of metal, plastic or any other suitable material(s).

Referring to FIGS. 7-9, the insert 50 can include an outer wall 54 defining an outer diameter 56 being substantially constant. Furthermore, the inner wall 48 can define an inner diameter 58 being substantially constant. The inner diameter 58 is complementary to the outer diameter 56 such that the outer wall 54 and the inner wall 48 engage each other to mount the insert 50 thereto. Substantially constant accounts for the inner and outer walls 48, 54 with threads or without threads. Therefore, the inner and outer walls 48, 54 complement each other such that the inner and outer walls 48, 54 can be standardized. Furthermore, having the inner and outer walls 48, 54 complement each other allows for standardizing of various components of the wheel assembly 20 as discussed further below, which can reduce manufacturing and assembly costs. It is to be appreciated that the inner and outer walls 48, 54 can be any suitable size and configuration.

The insert 50 can be mounted to the inner wall 48 by any suitable methods. For example, the insert 50 can be friction fit or press fit to the inner wall 48. As another example, the insert 50 can be adhered to the inner wall 48. As yet another example, the insert 50 can be threaded as shown in FIGS. 1, 7 and 9-13 and the inner wall 48 can have complimentary threads such that the threads of the insert 50 engage the threads of the inner wall 48 to mount the insert 50 thereto. In other words, the outer wall 54 of the insert 50 can be threaded, and correspondingly the inner wall 48 can be threaded. Alternatively, the inner and outer walls 48, 54 can be without threads as shown in FIGS. 8 and 15-17. As yet another example, the insert 50 can be fastened or bolted to the inner wall 48. It is to be appreciated that the insert 50 can be mounted to the inner wall 48 with fasteners, adhesive, etc., and as suggested above, the insert 50 can be permanently affixed to the inner wall 48 or removable from the inner wall 48. It is to further be appreciated that FIGS. 1, 7 and 9-13 illustrating threads on the outer wall 54 are for illustrative purposes only, and therefore, the outer wall 54 of the insert 50 can be threaded for any of the embodiments of FIGS. 1, 7, 9-13 and 15-17, or the threads can be eliminated from the outer wall 54 for any of the embodiments of FIGS. 1, 7, 9-13 and 15-17.

As best shown in FIGS. 7-9, the insert 50 can also present an interior wall 60 defining a perimeter of the aperture 52. Generally, the interior wall 60 is spaced from the outer wall 54 of the insert 50. In other words, the outer wall 54 of the insert 50 and the interior wall 60 of the insert 50 do not intersect. The configuration of the interior wall 60 can be adjustable or variable which correspondingly adjusts or varies the aperture 52 of the insert 50 to attenuate different frequencies produced in the interior cavity 42. In other words, changing the configuration of the interior wall 60 correspondingly changes the size of the aperture 52. Thus, changing the configuration of the interior wall 60 correspondingly changes the area of the aperture 52. The interior wall 60 can be adjustable to one of a plurality of different configurations while the outer wall 54 remains substantially constant. As such, the insert 50 is versatile for many different frequencies, such as resonant frequencies, and therefore can be utilized with many different rims 22/tires 34 of many different vehicles.

Continuing with FIG. 9, in certain embodiments, the insert 50 can include a first end 62 and a second end 64 spaced from each other along a center axis 66. Generally, the aperture 52 extends through the first and second ends 62, 64. In various embodiments, the aperture 52 is disposed along the center axis 66. The interior wall 60 can define a first length 68 between the first and second ends 62, 64 as shown in FIGS. 9-13. The first length 68 can be of from about 3.0 millimeters (mm) to about 35.0 millimeters (mm). It is to be appreciated that that this range is for illustrative purposes only and the first length 68 can be other lengths. Furthermore, the outer wall 54 can define a second length 70 being substantially constant as shown in FIGS. 9-13. In other words, the second length 70 of the outer wall 54 is standardized for cooperating with the standardized configuration of the inner wall 48. In one embodiment, the first and second lengths 68, 70 are equal such that the first and second lengths 68, 70 extend from the first end 62 to the second end 64. In another embodiment, as shown in FIGS. 9-13, the first length 68 is greater than the second length 70. The first length 68 is adjustable or changeable to attenuate different frequencies, such as resonant frequencies, produced in the interior cavity 42.

Optionally, in certain embodiments, the first end 62 of the insert 50 can define a tool receptacle 72 for removing the insert 50 from the inner wall 48. The tool receptacle 72 is disposed along one of the first and second ends 62, 64. For example, as best shown in FIG. 7, the tool receptacle 72 can be configured for receiving a tool, such as a screw driver, a socket, a key, an Allen wrench, etc. Suitable tools include, but are not limited to, a slot type screw driver, a Phillips-head type of screw driver, a hex type key or Allen wrench, etc. It is to be appreciated that the tool receptacle 72 can be any suitable configuration and any suitable tool can be utilized to detach or remove the insert 50 from the inner wall 48.

Figures 11, 12, 13:
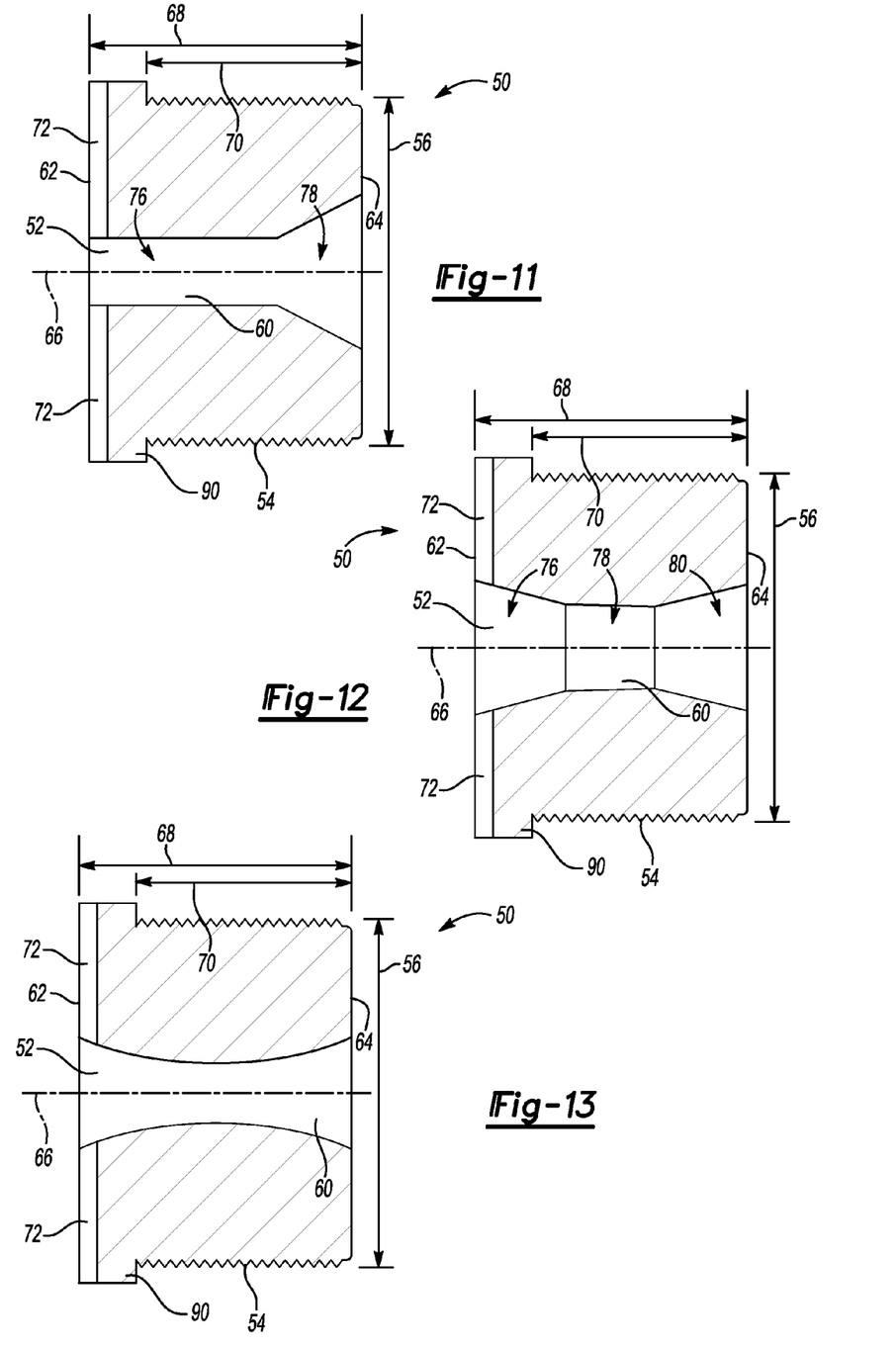
FIG. 11 is a schematic cross-sectional view of the insert, with the first configuration of the first portion being different from the second configuration of the second portion.
FIG. 12 is a schematic cross-sectional view of the insert, with the first configuration of the first portion being different from the second configuration of the second portion, with the interior wall including a third portion defining a third configuration different from the second configuration.
FIG. 13 is a schematic cross-sectional view of the insert, with the interior wall being arcuate between the first and second ends.

As mentioned above, the interior wall 60 can be configured of various different configurations to attenuate different frequencies, such as resonant frequencies. As shown in FIG. 9, the interior wall 60 defines a first diameter 74 less than the outer diameter 56 of the outer wall 54, with the first diameter 74 being constant along the center axis 66 between the first and second ends 62, 64 to define one of the different configurations. More specifically, the first diameter 74 is constant along the first length 68. Generally, the first diameter 74 can be of from about 2.0 mm to about 12.0 mm. It is to be appreciated that that this range is for illustrative purposes only and the first diameter 74 can be other diameters. As another example, as shown in FIGS. 10 and 11, the interior wall 60 includes a first portion 76 and a second portion 78 abutting each other, with the first portion 76 defining a first configuration and the second portion 78 defining a second configuration different from the first configuration to define another one of the different configurations. Specifically, FIG. 10 illustrates the first portion 76 tapering and the second portion 78 being constant, while FIG. 11 illustrates the first portion 76 being constant and the second portion 78 tapering. As yet another example, as shown in FIG. 12, the interior wall 60 includes a third portion 80 abutting the second portion 78, with the second portion 78 disposed between the first and third portions 76, 80, and with the third portion 80 defining a third configuration different from the second configuration to define yet another one of the different configurations. Therefore, the third portion 80 can be the same configuration as the first portion 76 or different configuration from the first portion 76. As yet another example, as shown in FIG. 13, the interior wall 60 can be arcuate, arced or curved in configuration such that the first diameter 74 is changing from the first end 62 to the second end 64 to define yet another one of the different configurations. For example, the interior wall 60 in FIG. 13 can be a convex configuration or a concave configuration. FIGS. 9-13 illustrate many different suitable configurations of the aperture 52. It is to be appreciated that FIGS. 9-13 are for illustrative purposes only and there are many other suitable configurations of the aperture 52, such as for example, tapering from the first end 62 to the second end 64 or vice versa (frusto-conical), square, rectangular, triangular, oval, polygon or any combination of the configurations discussed herein, etc.

Figure 2:
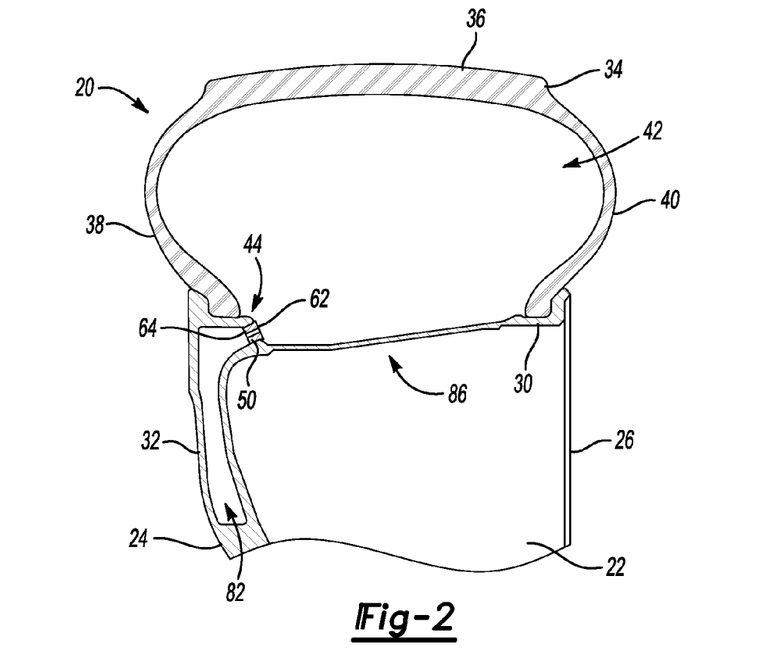
FIG. 2 is a schematic cross-sectional view of a resonator incorporated into the rim, with a flange extending from a first side of the rim.
Figure 3:
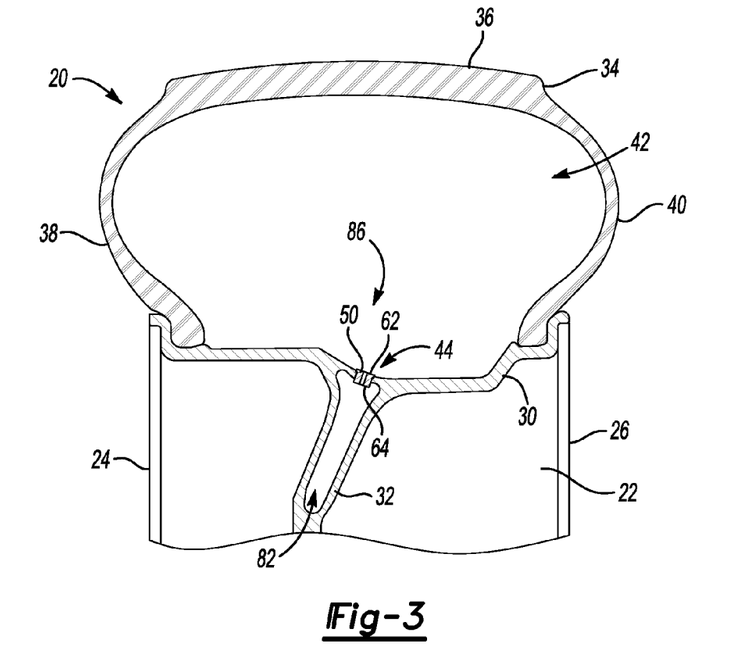
FIG. 3 is a schematic cross-sectional view of the resonator incorporated into the rim, with the flange extending generally from a middle portion of the rim.

Furthermore, the resonator 44 can be in many different locations and present many different configurations, some of which are discussed herein (compare FIGS. 2-6) and these examples are not intended to be limiting. As shown in FIGS. 2, 3 and 6, the resonator 44 can be incorporated in the rim 22 such that the rim 22 defines the hole 46 and presents the inner wall 48. In other embodiments, as shown in FIGS. 4 and 5, the resonator 44 is disposed inside the interior cavity 42. The different locations of the resonators 44 will be discussed in turn below. Any of the configurations of the interior wall 60/aperture 52 of the insert 50 as discussed above can be utilized with any of the embodiments of FIGS. 2-6, and therefore, these configurations will not be re-discussed.

For the embodiments of FIGS. 1-3, the resonator 44 is incorporated into the rim 22. For example, the resonator 44 can be incorporated in the rim 22 such that the rim 22 defines the hole 46 and presents the inner wall 48. Therefore, in these embodiments, the insert 50 is mounted to the inner wall 48 of the rim 22. More specifically, the resonator 44 can be incorporated in at least one of the annular body 30 and the flange 32 of the rim 22. Specifically, the annular body 30 defines the hole 46 and presents the inner wall 48. Furthermore, in these embodiments, the resonator 44 can further define a chamber 82 incorporated in the flange 32 of the rim 22 and spaced from the interior cavity 42 such that the hole 46 is disposed between the chamber 82 and the interior cavity 42. The chamber 82 is in fluid communication with the interior cavity 42 through the aperture 52 of the insert 50. Generally, the chamber 82 is disposed outside of the interior cavity 42 as shown in FIGS. 2 and 3, with the first end 62 of the insert 50 cooperating with the interior cavity 42 and the second end 64 of the insert 50 cooperating with the chamber 82 of the rim 22. In other words, the first end 62 of the insert 50 faces into the interior cavity 42 and the second end 64 of the insert 50 faces into the chamber 82 of the rim 22. The chamber 82 can have a volume of from about 60,000 cubic millimeters (mm³) to about 240,000 cubic millimeters (mm³). It is to be appreciated this range is for illustrative purposes only and the volume of the chamber 82 can be other volumes.

Figure 14:
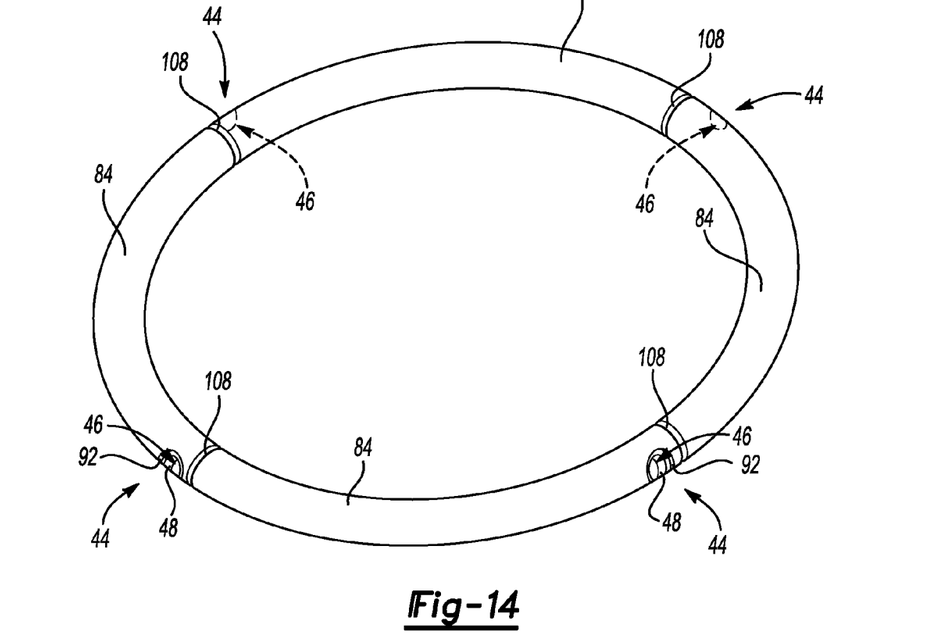
FIG. 14 is a schematic perspective view of the housing of the resonator for the embodiment of FIG. 4.

For the embodiments of FIGS. 4 and 5, the resonator 44 can include a housing 84 coupled to the rim 22 inside the interior cavity 42. Specifically, the housing 84 defines the hole 46 and presents the inner wall 48. Therefore, the insert 50 is mounted to the inner wall 48 of the housing 84. As shown in FIG. 4, the housing 84 can be attached to the rim 22 as a self-contained unit within the interior cavity 42. Hence, the housing 84 can be welded, bonded, adhered, affixed, etc., to the rim 22 separately. FIG. 14 illustrates the housing 84 of FIG. 4 removed from the rim 22. Alternatively, as shown in FIG. 5, the housing 84 can be formed as a unit or one-piece with the rim 22 inside the interior cavity 42. In other words, the housing 84 and the rim 22 can be integrally formed to each other. The housing 84 can be any suitable configuration, for example, as shown in FIGS. 4 and 14, the housing 84 can have a generally circular cross-section or as shown in FIG. 5, the housing 84 cooperates with the rim 22 to define a generally rectangular cross-section. Other examples of suitable configurations of the housing 84 can include oval, square, triangular, etc.

Furthermore, for the embodiments of FIGS. 4 and 5, the chamber 82 is incorporated in the housing 84. The hole 46 of the housing 84 is disposed between the chamber 82 and the interior cavity 42 such that the chamber 82 is in fluid communication with the interior cavity 42 through the aperture 52 of the insert 50. The first end 62 of the insert 50 cooperates with the interior cavity 42 and the second end 64 of the insert 50 cooperates with the chamber 82 of the housing 84. In other words, the first end 62 of the insert 50 faces into the interior cavity 42 and the second end 64 of the insert 50 faces into the chamber 82 of the housing 84. It is to be appreciated that the housing 84 can be any suitable location inside the interior cavity 42 and FIGS. 4 and 5 illustrate different locations for illustrative purposes only. Specifically, FIG. 4 illustrates the housing 84 disposed generally along a middle portion 86 of the annular body 30 of the rim 22 between the first and second sides 24, 26 and FIG. 5 illustrates the housing 84 disposed adjacent the first side 24 of the rim 22. Again, as discussed above, the chamber 82 can have a volume of from about 60,000 mm³ to about 240,000 mm³. It is to be appreciated this range is for illustrative purposes only and the volume of the chamber 82 can be other volumes.

For the embodiment of FIG. 6, the housing 84 is disposed outside of the interior cavity 42, with the rim 22 defining the hole 46 and presenting the inner wall 48. More specifically, the annular body 30 of the rim 22 can define the hole 46. Generally, the housing 84 can be a panel 88 attached to the rim 22. For example, the panel 88 can be attached to the annular body 30 of the rim 22 and one or more of the flanges 32 of the rim 22 such that the panel 88, the rim 22 and the flange(s) 32 cooperate to define the chamber 82. The panel 88 can be attached to the rim 22 and the flange(s) 32 as a separate piece. As such, the panel 88 can be attached to the rim 22 and the flange(s) 32 by any suitable methods, such as for example, welding, etc. It is to be appreciated that the housing 84 of FIG. 5 can be a separate piece, similar to the panel 88 of FIG. 6, such that the panel 88 and the rim 22 cooperate to define the chamber 82, with the panel 88 attached to the rim 22 by any suitable methods, such as welding, etc. The volume of the chamber 82 can be the same as discussed above and will not be re-discussed.

As best shown in FIG. 7, optionally, the insert 50 can include a lip 90 extending outwardly from the outer wall 54 adjacent to the first end 62. Generally, the lip 90 extends away from the center axis 66. Furthermore, optionally, the rim 22 or the housing 84 can define a recess 92 for receiving the lip 90, depending on which embodiment is being utilized.

Figure 15:
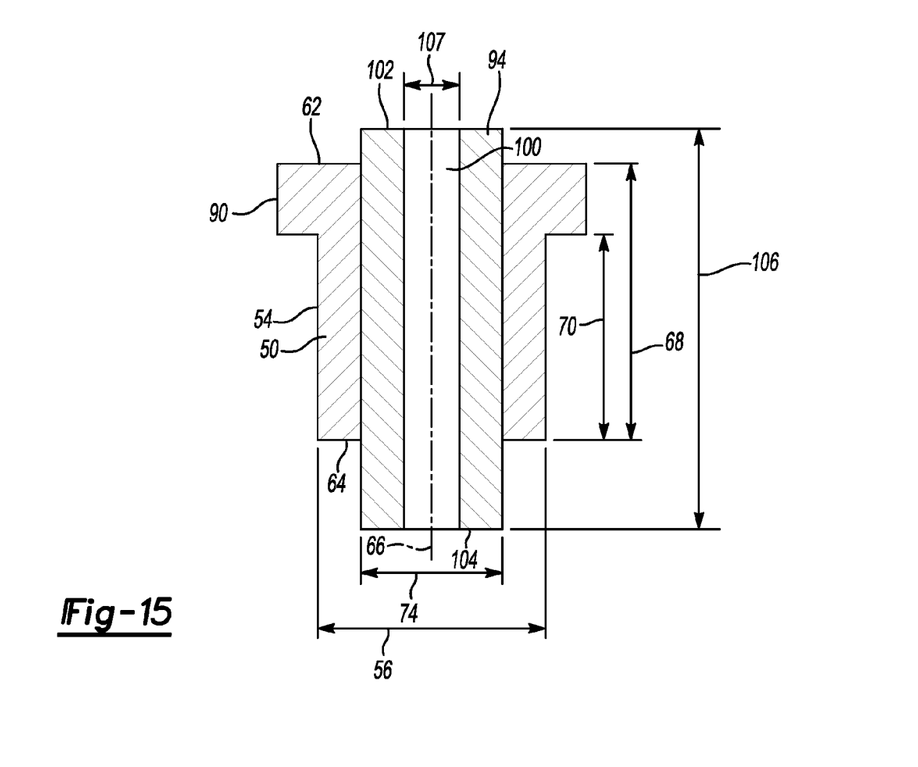
FIG. 15 is a schematic cross-sectional view of the insert including a tube.
Figures 16, 17, 18:
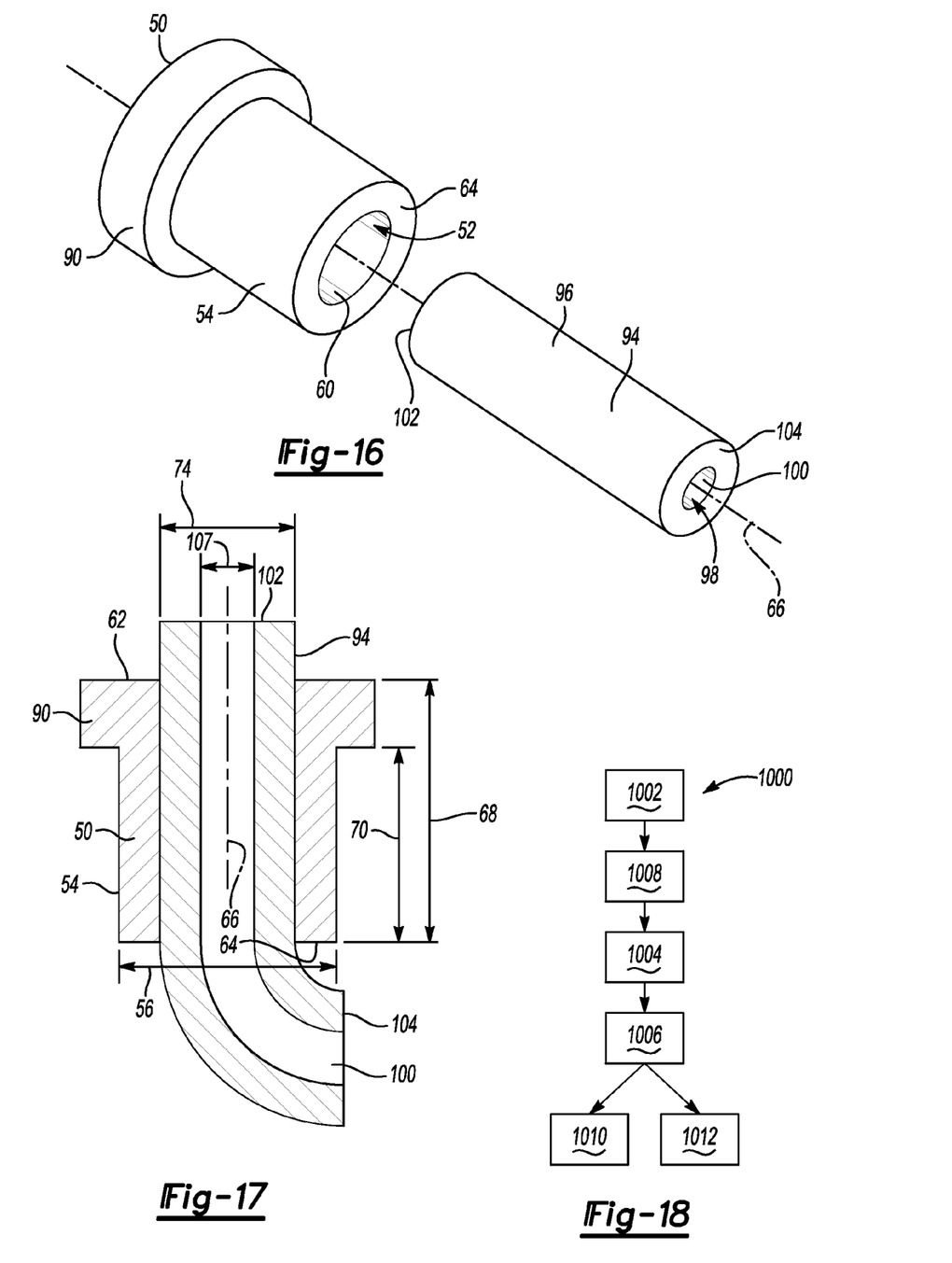
FIG. 16 is a schematic exploded perspective view of the insert and the tube.
FIG. 17 is a schematic cross-sectional view of the insert and the tube including one of a first distal end and a second distal end turned toward an outer wall of the insert.
FIG. 18 is a schematic flowchart of a method of manufacturing the wheel assembly of FIGS. 1-17.

In yet other embodiments, as shown in FIGS. 15-17 the insert 50 can include a tube 94 mounted to the interior wall 60 of the insert 50. The tube 94 can include an outside wall 96 engaging the interior wall 60 of the insert 50 to mount the tube 94 inside the insert 50. The tube 94 can define a through-hole 98 to present an inside wall 100 defining a periphery of the through-hole 98. The tube 94 can have a first distal end 102 and a second distal end 104 spaced from each other, with the through-hole 98 extending through the first and second distal ends 102, 104. Generally, the through-hole 98 extends at least partially along the center axis 66. The first distal end 102 of the tube 94 can be adjacent to the first end 62 of the insert 50 and the second distal end 104 of the tube 94 can be adjacent to the second end 64 of the insert 50. In certain embodiments, the first distal end 102 of the tube 94 extends beyond the first end 62 of the insert 50 and/or the second distal end 104 of the tube 94 extends beyond the second end 64 of the insert 50. Therefore, the tube 94 can define a third length 106 greater than the first length 68. The third length 106 provides additional adjustments or changeability to attenuate different frequencies, such as resonant frequencies. Generally, in this embodiment, the third length 106 can be of from about 3.0 mm to about 35.0 mm and the inside wall 100 can present a diameter 107 of from about 2.0 mm to about 12.0 mm. It is to be appreciated that these ranges are for illustrative purposes only and the third length 106 can be other lengths and the diameter 107 can be other diameters. In this embodiment, it is to be appreciated that the first diameter 74 of the interior wall 60 of the insert 50 can be greater than 12.0 mm to accommodate the various sizes of the tube 94.

Furthermore, one of the first and second distal ends 102, 104 of the tube 94 can be orientated differently from another one of the first and second distal ends 102, 104 as shown in FIG. 17. For example, in FIG. 17, the second distal end 104 of the tube 94 is curved toward the outer wall 54 of the insert 50. Therefore, if the chamber 82 of the resonator 44 is not large enough to accommodate the tube 94 being straight along the center axis 66, one of the first and second distal ends 102, 104 can be turned. The inside wall 100 can be configured as discussed above for the interior wall 60 and will not be re-discussed. As such, the insert 50 including the tube 94 provides additional suitable configurations. Furthermore, the interior wall 60 of the insert 50 remains constant and at least a portion of the outside wall 96 of the tube 94 remains constant to provide interchangeability of the tube 94. The tube 94 can be formed of metal, plastic, rubber or any other suitable material(s). Additionally, for this embodiment, the outer wall 54 of the insert 50 can be attached to the inner wall 48 as discussed above (threaded, adhered, friction fit, etc.), and therefore, will not be re-discussed.

In yet another embodiment, the hole 46 of the resonator 44 can be further defined as a first hole 46 and the inner wall 48 further defined as a first inner wall 48, with the resonator 44 also defining a second hole spaced from the first hole 46. The second hole presents a second inner wall defining a boundary of the second hole. Therefore, the first 46 and second holes are disposed between the chamber 82 of the resonator 44 and the interior cavity 42. As such, one insert 50 can be mounted to the first inner wall 48 and another insert 50 can be mounted to the second inner wall. Thus, a plurality of inserts 50 can cooperate with one chamber 82 of one resonator 44.

As indicated in FIGS. 1 and 14, the resonator 44 can be further defined as a plurality of resonators 44. In other words, any suitable number of resonators 44 can be utilized with the wheel assembly 20. For example, two to eight resonators 44 can be utilized in each wheel assembly 20. One or more of the resonators 44 can be used for the same frequency or one or more resonators 44 can be used for different frequencies. For illustrative purposes only, FIG. 1 illustrates two resonators 44 and FIG. 14 illustrates four housings 84 (and thus four resonators 44), with each of the housings 84 separated by a partition 108. The housings 84 and the partitions 108 cooperate to separate each of the chambers 82. It is to be appreciated that for the embodiments of FIGS. 5 and 6, each of the housings 84 can be separated by the partition 108. Alternatively, for the embodiments of FIGS. 4-6, each of the housings 84 can be spaced from each other such that the partitions 108 can be eliminated. Furthermore, more than one insert 50 can be utilized with each of the resonators 44. It is to be appreciated that FIG. 14 illustrates two of the holes 46 in phantom lines without illustrating the phantom lines for the recesses 92 and the inner walls 48 to generally locate the position of the holes 46 for illustrative purposes only.

Referring to FIG. 18, the present disclosure also provides a method 1000 of manufacturing the wheel assembly 20 for the vehicle. This method 1000 further standardizes the assembly process of the wheel assembly 20. The method 1000 includes providing 1002 the resonator 44 defining the hole 46 such that the resonator 44 presents the inner wall 48 defining the boundary of the hole 46. The method 1000 further includes attaching 1004 the first side wall 38 of the tire 34 to the rim 22 and attaching 1006 the second side wall 40 of the tire 34 to the rim 22. The tire 34 and the rim 22 cooperate with each other to define the interior cavity 42 therebetween. Simply stated, the tire 34 is attached to the rim 22 to define the interior cavity 42.

The method 1000 also includes mounting 1008 the insert 50 of the resonator 44 to the inner wall 48. The insert 50 defines the aperture 52 in fluid communication with the interior cavity 42 to attenuate sound produced inside the interior cavity 42. Generally, mounting 1008 the insert 50 to the inner wall 48 occurs before attaching 1004 the first side wall 38 of the tire 34 to the rim 22 and attaching 1006 the second side wall 40 of the tire 34 to the rim 22. Simply stated, the insert 50 is mounted before attaching the tire 34 to the rim 22. Therefore, depending on the parameters of the wheel assembly 20, such as the frequencies produced by the wheel assembly 20, the appropriate insert 50 can be selected and mounted to the inner wall 48. The insert 50 being mounted to the inner wall 48 can be of any of the configurations discussed above to attenuate the desired frequency. As such, the rim 22 can be standardized while the insert 50 can be interchanged to attenuate the desired frequency.

Furthermore, in the embodiment of FIGS. 2 and 3, providing 1002 the resonator 44 can include incorporating the resonator 44 in the rim 22 such that the rim 22 defines the hole 46 and presents the inner wall 48. Therefore, mounting 1008 the insert 50 of the resonator 44 to the inner wall 48 can include mounting the insert 50 to the inner wall 48 of the rim 22.

For the embodiment of FIGS. 4 and 5, the method 1000 can further include coupling 1010 the housing 84 of the resonator 44 to the rim 22 inside the interior cavity 42, with the housing 84 defining the hole 46 and presenting the inner wall 48. Therefore, mounting 1008 the insert 50 of the resonator 44 to the inner wall 48 can include mounting the insert 50 to the inner wall 48 of the housing 84. In one embodiment, coupling 1010 the housing 84 of the resonator 44 to the rim 22 inside the interior cavity 42 occurs before mounting 1008 the insert 50 of the resonator 44 to the inner wall 48. In another embodiment, coupling 1010 the housing 84 of the resonator 44 to the rim 22 inside the interior cavity 42 occurs after mounting 1008 the insert 50 of the resonator 44 to the inner wall 48.

For the embodiment of FIG. 6, the method 1000 can further include coupling 1012 the housing 84 of the resonator 44 to the rim 22 outside of the interior cavity 42, with the rim 22 defining the hole 46 and presenting the inner wall 48. Therefore, mounting 1008 the insert 50 of the resonator 44 to the inner wall 48 can include mounting the insert 50 to the inner wall 48 of the rim 22. In one embodiment, coupling 1012 the housing 84 of the resonator 44 to the rim 22 outside of the interior cavity 42 occurs before mounting 1008 the insert 50 of the resonator 44 to the inner wall 48. In another embodiment, coupling 1012 the housing 84 of the resonator 44 to the rim 22 outside of the interior cavity 42 occurs after mounting 1008 the insert 50 of the resonator 44 to the inner wall 48.

In certain embodiments, providing 1002 the resonator 44 can include providing the plurality of resonators 44 each defining respective holes 46 such that each of the resonators 44 present respective inner walls 48. Therefore, mounting 1008 the insert 50 can include mounting the plurality of inserts 50 to respective inner walls 48, with the inserts 50 each defining respective apertures 52. Furthermore, mounting the inserts 50 to respective inner walls 48 can include mounting one of the inserts 50 defining the aperture 52 of a first configuration to one of the inner walls 48 and mounting another one of the inserts 50 defining the aperture 52 of a second configuration different from the first configuration to another one of the inner walls 48. As discussed above, the different configurations of the inserts 50 are shown in FIGS. 9-13 and 15-17, but are not limited to these configurations, and will not be re-discussed. In addition, mounting the inserts 50 to respective inner walls 48 can include mounting one of the inserts 50 defining the aperture 52 of the first configuration to one of the inner walls 48 and mounting another one of the inserts 50 defining the aperture 52 being the same configuration as the first configuration to another one of the inner walls 48.

It is to be appreciated that the order or sequence of performing the method 1000 as identified in the flowchart of FIG. 18 is for illustrative purposes and other orders or sequences are within the scope of the present disclosure. It is to also be appreciated that the method 1000 can include other features not specifically identified in the flowchart of FIG. 18.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A wheel assembly for a vehicle, the assembly comprising:
   a rim;

a tire including a distal wall, a first side wall and a second side wall, with the first and second side walls extending from the distal wall, and each of the side walls attached to the rim such that the distal wall is spaced from the rim to define an interior cavity between the tire and the rim;

a resonator defining a hole such that the resonator presents an inner wall defining a boundary of the hole, with the hole cooperating with the interior cavity; and wherein the resonator includes an insert mounted to the inner wall, with the insert defining an aperture in fluid communication with the interior cavity for attenuating sound produced inside the interior cavity;

wherein the insert includes an outer wall defining an outer diameter being substantially constant and the inner wall defines an inner diameter being substantially constant, with the inner diameter complementary to the outer diameter such that the outer wall and the inner wall engage each other to mount the insert thereto;

wherein the insert presents an interior wall defining a perimeter of the aperture, with the interior wall spaced from the outer wall of the insert and being adjustable to one of a plurality of different configurations while the outer wall remains substantially constant;

wherein the aperture is disposed along a center axis, with the insert including a first end and a second end spaced from each other along the center axis, and with the aperture extending through the first and second ends;

wherein the interior wall includes a first portion and a second portion abutting each other, with the first portion defining a first configuration and the second portion defining a second configuration different from the first configuration to define one of the different configurations.

2. An assembly as set forth in claim 1 wherein the interior wall includes a third portion abutting the second portion, with the second portion disposed between the first and third portions, and with the third portion defining a third configuration different from the second configuration to define another one of the different configurations.

3. An assembly as set forth in claim 1 wherein the resonator is incorporated in the rim such that the rim defines the hole and presents the inner wall, with the insert mounted to the inner wall of the rim.

4. An assembly as set forth in claim 3 wherein the rim includes an annular body and a flange extending from the annular body, with the resonator incorporated in at least one of the annular body and the flange.

5. An assembly as set forth in claim 4 wherein the annular body defines the hole and presents the inner wall, and wherein the resonator defines a chamber incorporated in the flange of the rim and spaced from the interior cavity such that the hole is disposed between the chamber and the interior cavity, with the chamber being in fluid communication with the interior cavity through the aperture of the insert.

6. An assembly as set forth in claim 1 wherein the resonator includes a housing coupled to the rim inside the interior cavity, with the housing defining the hole and presenting the inner wall, and with the insert mounted to the inner wall of the housing.

7. An assembly as set forth in claim 6 wherein the resonator defines a chamber incorporated in the housing, with the hole of the housing disposed between the chamber and the interior cavity such that the chamber is in fluid communication with the interior cavity through the aperture of the insert.

8. A method of manufacturing a wheel assembly for a vehicle; the method comprising:

providing a resonator defining a hole such that the resonator presents an inner wall defining a boundary of the hole;

attaching a first side wall of a tire to a rim;

attaching a second side wall of the tire to the rim, with the tire and the rim cooperating with each other to define an interior cavity therebetween; and mounting an insert of the resonator to the inner wall, with the insert defining an aperture in fluid communication with the interior cavity to attenuate sound produced inside the interior cavity, and wherein mounting the insert to the inner wall occurs before attaching the first side wall of the tire to the rim and attaching the second side wall of the tire to the rim.

9. A method as set forth in claim 8 wherein providing the resonator includes incorporating the resonator in the rim such that the rim defines the hole and presents the inner wall, and wherein mounting the insert of the resonator to the inner wall includes mounting the insert to the inner wall of the rim such that the hole of the rim at least partially surrounds the aperture of the insert.

10. A method as set forth in claim 8 further comprising coupling a housing of the resonator to the rim inside the interior cavity, with the housing defining the hole and presenting the inner wall, and wherein mounting the insert of the resonator to the inner wall includes mounting the insert to the inner wall of the housing such that the hole of the housing at least partially surrounds the aperture of the insert.

11. A method as set forth in claim 8 wherein providing the resonator includes providing a plurality of resonators each defining respective holes such that each of the resonators present respective inner walls, and wherein mounting the insert includes mounting a plurality of inserts to respective inner walls, with the inserts each defining respective apertures such that respective holes of the resonators at least partially surround respective apertures of respective inserts.

12. A method as set forth in claim 11 wherein mounting the inserts to respective inner walls includes mounting one of the inserts defining the aperture of a first configuration to one of the inner walls and mounting another one of the inserts defining the aperture of a second configuration different from the first configuration to another one of the inner walls.

13. A method as set forth in claim 11 wherein mounting the inserts to respective inner walls includes mounting one of the inserts defining the aperture of a first configuration to one of the inner walls and mounting another one of the inserts defining the aperture being the same configuration as the first configuration to another one of the inner walls.

14. A method as set forth in claim 8 further comprising engaging a receptacle of the insert to remove the insert from the hole of the resonator.

15. A wheel assembly for a vehicle, the assembly comprising:

a rim;

a tire including a distal wall, a first side wall and a second side wall, with the first and second side walls extending from the distal wall, and each of the side walls attached to the rim such that the distal wall is spaced from the rim to define an interior cavity between the tire and the rim;

a resonator defining a hole such that the resonator presents an inner wall defining a boundary of the hole, with the hole cooperating with the interior cavity;

wherein the resonator includes an insert mounted to the inner wall, with the insert defining an aperture in fluid communication with the interior cavity for attenuating sound produced inside the interior cavity; and wherein the insert includes an end defining a receptacle engageable to remove the insert from the hole of the resonator.

16. An assembly as set forth in claim 15 wherein the insert includes an outer wall that engages the inner wall to mount the insert to the hole of the resonator, and wherein the insert presents an interior wall defining a perimeter of the aperture, with the interior wall spaced from the outer wall of the insert, and the interior wall is adjustable to one of a plurality of different configurations while the outer wall remains substantially constant, and wherein the aperture is disposed along a center axis, with the insert including a second end spaced from the first end along the center axis, and with the aperture extending through the first and second ends.

17. An assembly as set forth in claim 16 wherein the interior wall defines a first diameter less than the outer diameter of the outer wall, with the first diameter being constant along the center axis between the first and second ends to define one of the different configurations.

18. An assembly as set forth in claim 16 wherein the interior wall includes a third portion abutting the second portion, with the second portion disposed between the first and third portions, and with the third portion defining a third configuration different from the second configuration to define another one of the different configurations.

19. An assembly as set forth in claim 16 wherein the interior wall presents a curved configuration between the first and second ends to define one of the different configurations.

20. An assembly as set forth in claim 16 wherein the insert includes a tube mounted to the interior wall of the insert, with the tube including a first distal end and a second distal end spaced from each other, and at least one of the first and second distal ends extend beyond respective first and second ends of the insert.

* * * * *